Feb. 21, 1956 F. P. GOHOREL 2,735,894

AUTOMATIC TELEPHONE SYSTEMS

Filed May 29, 1952 4 Sheets-Sheet 1

Inventor
F. P. GOHOREL
By Robert Harding Jr.
Attorney

Inventor
F. P. GOHOREL
By Robert Harding Jr.
Attorney

INVENTOR.
F. P. GOHOREL
BY Robert Harding Jr.
ATTORNEY

INVENTOR.
F. P. GOHOREL
BY Robert Harding Jr.
ATTORNEY

United States Patent Office 2,735,894

Patented Feb. 21, 1956

2,735,894

AUTOMATIC TELEPHONE SYSTEMS

Fernand Pierre Gohorel, Antony, France, assignor to International Standard Electric Corporation, New York, N. Y., a corporation of Delaware Application May 29, 1952, Serial No. 290,787

Claims priority, application France May 31, 1951

7 Claims. (Cl. 179—18)

This invention relates to an automatic telephone switching system wherein a common member or director is used to direct several selectors at each selecting stage, and in particular to improve means for handling telephone connections to multi-party subscriber lines in such systems.

The invention, according to one embodiment thereof, has been applied by way of example to a telephone switching system, employing switches of the cross-bar type, disclosed and fully described in my co-pending application, Serial No. 279,624, filed on March 31, 1952, hereinafter referred to as the main application.

The present invention relates to arrangements whereby party-lines, comprising two or more stations in parallel, may be connected to the automatic exchange described in said main application. According to these arrangements, each of said stations is assigned a particular call-number, taken from the general numbering scheme for subscriber lines in said exchange, and a single outlet position is provided in the banks of the final selectors for all the stations connected to one and the same party-line. This results in the saving of outlet positions at the final selectors and in the possibility of using fewer final selectors than would otherwise be required by the numbering scheme. Furthermore, it is also possible to use the outlet positions made available in this manner for the connection of lines grouped under a common call-number, for example, the lines connected to a P. B. X switchboard.

One of the features of the invention is the provision of a marking distributor, or cross-connecting frame, consisting of the combination of a first row of terminals each associated with a particular call-number taken from the general numbering scheme for subscriber lines, a second row of terminals each associated with a line connected to a particular position in the banks of the final selectors, and a third row of terminals connected to ringing devices adapted for selectively ringing party-line stations, each of the various terminals in the said first row associated with the stations pertaining to one party-line being cross-connected to the terminal in the said second row that corresponds to said line, while at the same time being capable of cross-connection also to said ringing devices, so that it becomes possible, by simply using movable connections, for example, jumper wires, to associate additional call-numbers, with one and the same party-line and to cut into the circuit the ringing device corresponding to the call-number dialed by the calling subscriber.

Another feature of the invention lies in the fact that, when a party-line comprises only two stations, only the first row terminal corresponding to the call-number of the second station is cross-connected to a party-line ringing device, so that, when the call-number of the first station is dialed, ringing takes place in the normal manner, but when the call-number of the second station is dialed, ringing is accomplished by means of said party-line ringing device, the two stations being distinguished from each other by their different methods of ringing.

The various distributor terminals in the first row, corresponding to the call-numbers of the stations on a party-line, are all cross-connected to the same terminal in the second row of said distributor, and also some or all of them are also individually cross-connected to different terminals of the party-line ringing devices. Therefore, precautions must be taken to avoid undesirable coupling between said first row terminals via second row terminals.

Another feature of the invention lies in the combination of the elements included in the first feature thereof with decoupling rectifiers, a rectifier being inserted in the circuit of each or at least of some of the conductors cross-connecting the various first row terminals associated with the call-numbers of party-line stations to the terminal in the second row associated with said party-line.

The ringing devices for ringing the stations on a party-line may be common to some or to all of the party-lines in the exchange. Consequently, the terminals associated with said devices may each be cross-connected to several terminals in the first row of the distributor. Therefore, precautions must also be taken to avoid undesirable coupling between said first row terminals via third row terminals.

Another feature of the invention lies in the combination of the elements included in the first feature thereof with decoupling rectifiers, a rectifier being connected in the circuit of each of the conductors that cross-connect the various first row terminals associated with the call-numbers of party-line stations to the terminals associated with the party-line ringing devices.

Other arrangements for avoiding undesirable coupling between terminals, without using rectifiers, may also be provided.

Another feature of the invention is the provision of a marking distributor comprising the combination of a first row of terminals each associated with a particular call-number taken from the general numbering scheme for subscriber lines, a second row of terminals each associated with a line connected to a particular position in the final selector banks, a third row of terminals connected to ringing devices associated with party-lines, and a fourth row of terminals each associated with a particular call-number taken from the general numbering scheme for subscriber lines, each of the terminals of the fourth row being associated with one of the terminals of the first row, the various first row terminals associated with the stations of one party-line being cross-connected to the single second row terminal corresponding to said party-line, and each of the fourth row terminals associated with said stations being cross-connected to one of the ringing devices, undesirable coupling between terminals being thereby rendered impossible.

Since the first row terminals associated with the stations on one and the same party-line are all cross-connected to one and the same terminal in the second row, a certain number of terminals in said second row, each corresponding to a particular position in the banks of the final selectors, can be made available for further use. It is therefore possible to use said available positions for connecting lines grouped under a common call-number.

Various other features of the invention will become apparent from the following description, given by way of a non-limitative embodiment, in connection with the appended drawings, in which.

Figure 3:
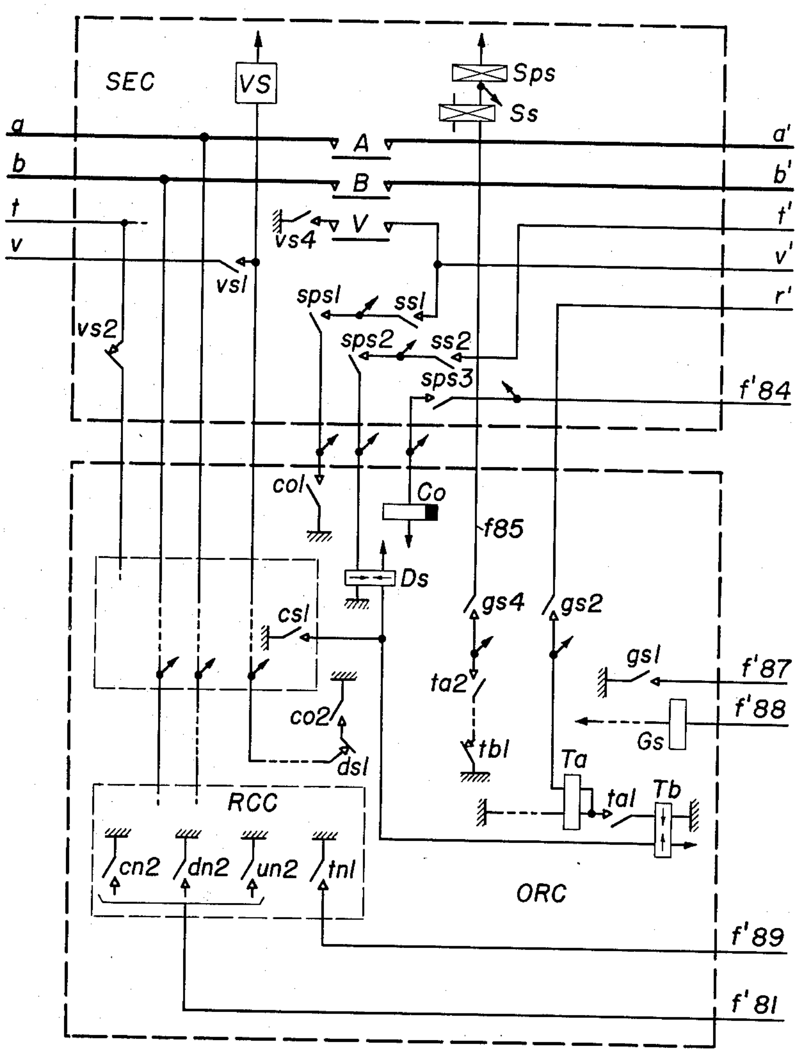
Figure 4:
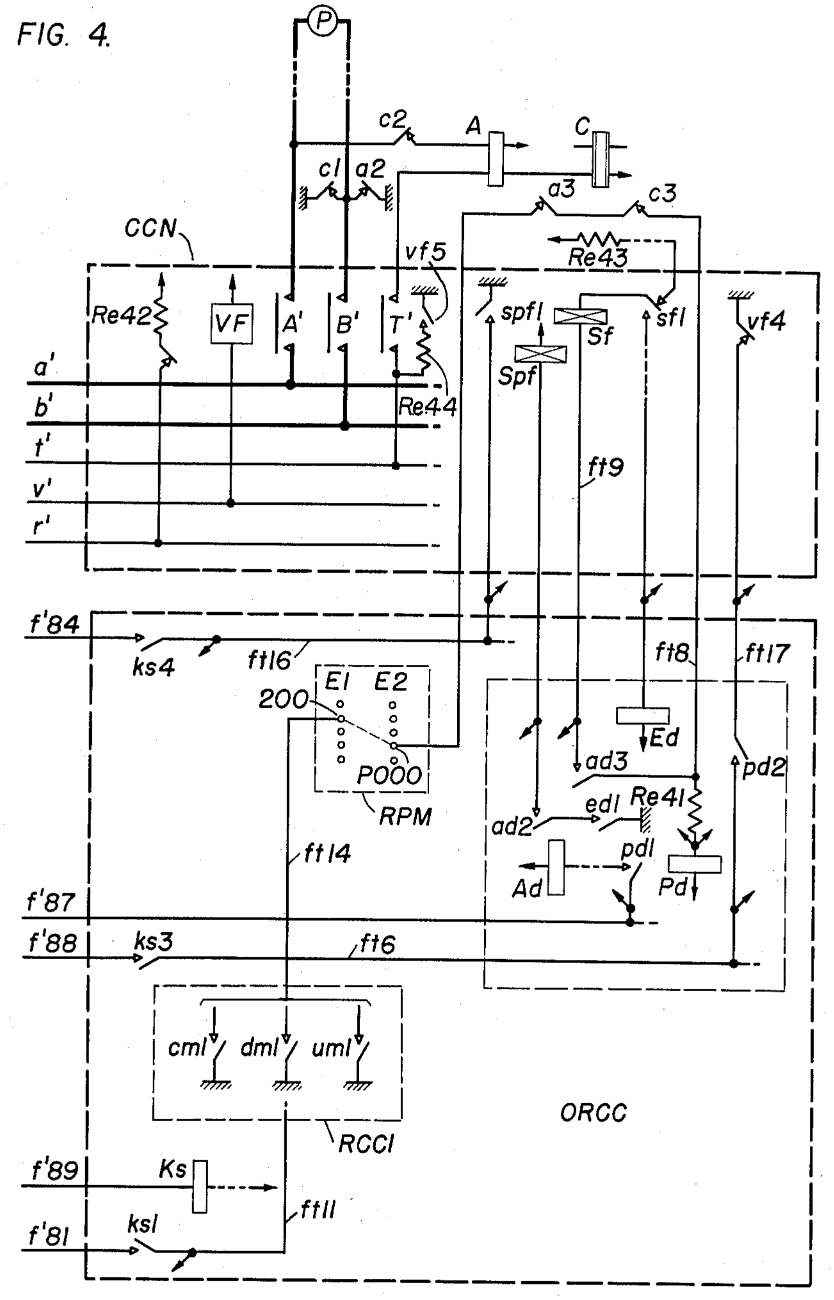

Figs. 3 and 4 show such significant portions of the detailed circuits of the automatic telephone exchange illustrated in Figs. 8 and 4, respectively, of the main application as are necessary for a complete understanding of the present invention and the manner in which it has been applied to the switching system described in said application. It is to be understood that Fig. 3 represents portions of the circuits of a "fifties" selector SEC and of its director ORC, while Fig. 4 represents portions of the circuits of "finderconnector" CCN and of its director ORCC which are concerned with the "connector" or final selector functions of that selecting stage, together with portions of the individual line circuit associated with a subscriber station P.

The marking distributor RPM shown in Fig. 1 will now be described in detail. In the main application is described a marking distributor RPM consisting of a cross-connecting frame located in the director ORCC of the final selector CCN and designed to handle 500 call-numbers taken from the general numbering scheme for subscriber lines. This distributor makes it possible, as explained in detail, to associate with a particular call-number one or more individual lines, that is, a single-station subscriber line or several lines grouped under the same call-number, said lines occupying any position whatever in the banks of the selection stages handling said call-numbers. In the embodiment to be described herein, the marking distributor according to the invention and the marking distributor according to the main application shown in outline in Fig. 4, are combined so as to form a single distributor, which will handle a block of 500 call-numbers; a portion of this distributor is illustrated in Fig. 1.

This combined distributor RPM accordingly comprises a first row E1 of 500 input terminals, each associated with a particular call-number. For the sake of simplicity, only the input terminals 200 . . . 219, associated with the call numbers 200 . . . 219, have been shown in the drawing. These terminals are permanently and severally connected to the outputs of a pyramid of relay contacts, shown schematically by the three contacts *c*, *d* and *u*, forming part of the digit receiving device RCC1 in the final selector director ORCC, Fig. 4. As indicated in the main application, the lines associated with the above-mentioned 500 call-numbers are selected by a group of "fifties" selectors, such as selector SEC, Fig. 3, and by the final selectors assigned thereto, such as final selector CCN, Fig. 4.

Figure 1:
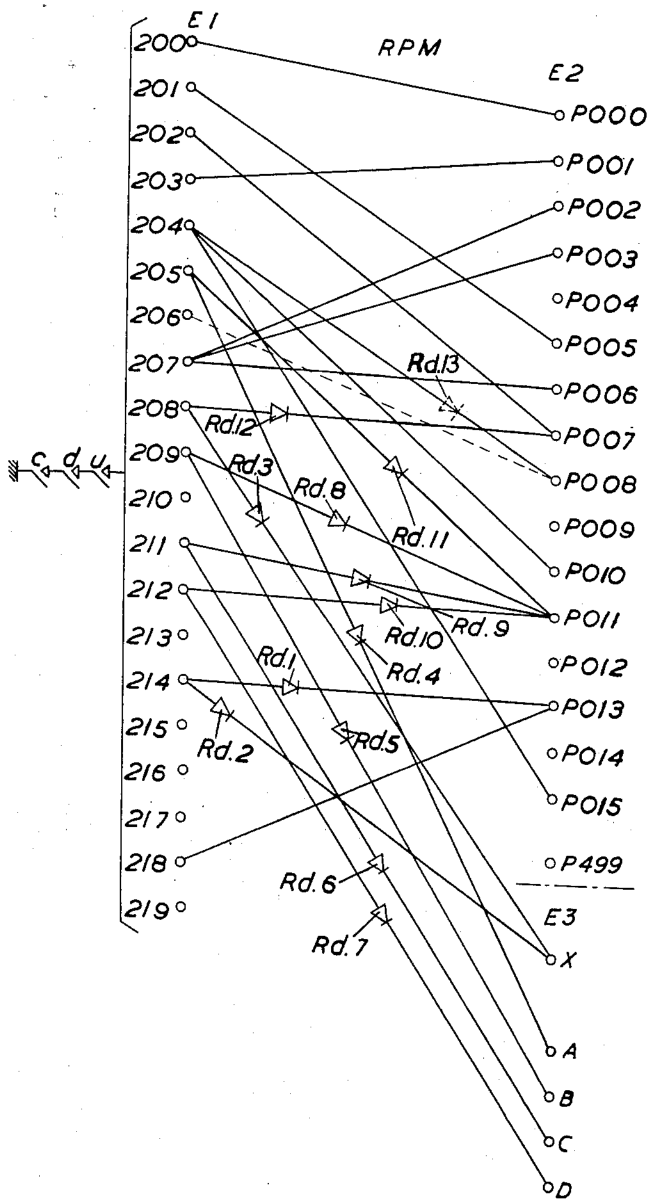
Fig. 1 shows a portion of a marking distributor according to the invention, wherein rectifiers are used in order to avoid undesirable coupling between terminals.

The distributor RPM, Fig. 1, comprises also a second row E2 of output terminals, such as terminals P000 . . . P499, each associated with a particular line, the reference character against each terminal indicating the position of the line with respect to the final selectors and the "fifties" selectors handling connections directed thereto. Thus, terminal P000 corresponds to a line occupying position 000 in the banks of the final selectors assigned to the "fifties" group 0, whereas the terminal numbered P499, if used, would be associated with a line occupying position 499 in the banks of the final selectors included in the last "fifties" group of the block of 500 lines, namely, group 9. Each of the output terminals P000 . . . P499 is connected, in the manner described in the main patent application, to a relay P*d*, Fig. 4, that controls the operation of the selection electromagnets in the "fifties" selector and the final selector concerned, as will be explained.

It is possible with the foregoing arrangements to associate, within a block of 500 numbers, a particular call-number with a line occupying any position whatever with respect to the last two selection stages. Thus, in the case shown in the drawing, the call-number 200 is associated with a line occupying position 000 in the banks of the group 0 final selectors, terminal 200 being cross-connected at distributor RPM to terminal P000; similarly, the call-number 201 is associated with a line occupying position 005 in the banks of the same final selectors.

Lastly, a third row of output terminals E3 is provided, each terminal of which is connected to a ringing device (not shown) adapted to ring a particular party-line station. Terminals A, B, C and D are provided for the case of a three-station or four-station party-line; terminal X is provided for the second station of a two-station party line. In accordance with known methods, these ringing devices enable the dialed station to be selected from among the various stations connected to one and the same line.

The 500 call-numbers handled by the dstributor RPM may be divided into four different categories:

Some of the call-numbers are associated with individual subscriber lines, that is, with single-station lines. Such is the case, for instance, with the call-numbers 200, 201 and 203 in the example illustrated in Fig. 1. Terminals 200, 201 and 203 are shown cross-connected to terminals P000, P005 and P001, respectively, the call-numbers 200, 201 and 203 being therefore associated with the subscriber lines occupying positions 000, 005 and 001, respectively, in the banks of the group 0 final selectors.

Other call-numbers are associated with grouped or P. B. X lines, that is, lines all reached by dialing the same number. Such is the case, for instance, of the call-number 204 in the example illustrated. Terminal 204 is shown cross-connected to the three output terminals P008, P010 and P015; consequently, the three lines associated with these output terminals are grouped under the single call-number 204.

Still other call-numbers are associated with two-station party-lines, that is, subscriber lines to which two stations are connected in parallel. These stations have different call-numbers taken from the general numbering scheme, and may be selectively called, according to various known methods, by suitable ringing devices. For example, the call-numbers 214 and 218 are associated with two subscriber stations connected in parallel on the same line. This line occupies only one position in the final selector banks. In the case illustrated, the input terminals 214 and 218 are both cross-connected to the output terminal P013, the party-line associated with the call-numbers 214 and 218 then occupying position 013 in the banks of the group 0 final selectors. Furthermore, said terminal 214 is also cross-connected to terminal X in the third row E3, said terminal X being in turn connected to a ringing device adapted to ring the second station of a two-station party-line. Rectifier R*d*1 is provided to decouple terminals 218 and 214, as will be explained hereinafter. Similarly the call-numbers 202 and 208 are associated with a two-station party-line occupying position 007. Rectifiers R*d*2 and R*d*3 are provided to decouple terminals 214 and 208, and rectifier R*d*12 to decouple terminals 202 and 208.

Lastly, other call-numbers are associated with party-lines over which more than two stations can be reached. The call-numbers 205, 209, 211 and 212, for instance, are associated with four subscriber stations, respectively, which are all connected to the same party-line. As in the preceding case, this line occupies only one position in the banks of the final selectors. Terminals 205, 209, 211 and 212 are all shown cross-connected to terminal P011, and therefore the party-line associated with the call-numbers 205, 209, 211 and 212 occupies position 011 in the banks of the group 0 final selectors. Furthermore, said terminals 205, 209, 211 and 212 are individually cross-connected to the four terminals A, B, C and D, respectively, which in turn are connected to suitable ringing devices, as stated.

The manner in which a connection is extended to a subscriber line is fully described in the main application. It will be understood, therefore, that the system described employs at each selection stage a type of cross-bar switch, known as a multi-connector, comprising a number of individual selectors each having access to 50 outlets common to the said multi-connector; that the call-numbers available in an exchange are divided into blocks each of 500 numbers; that the call-numbers of a particular block of 500 are severally assigned, as required, to a group of subscriber lines; that the lines comprising said group are connected, by sub-groups of 50, in the banks of groups of final selectors; that said final selectors are connected in the banks of one or more groups of "fifties" selectors; and that any one of the lines comprising said group can accordingly be reached through a "fifties" selector, capable of selecting the particular sub-group of 50 to which said line belongs, and a final selector which has access to all the lines of said particular sub-group.

The significant steps in the operations involved in extending a connection to an individual subscriber line, such as the line corresponding to the call-number 200 in the example illustrated in Fig. 1, through a "fifties" selector, such as selector SEC, and a final selector, such as selector CCN, will now be described with reference to Figs. 3 and 4, which should be juxtaposed with Fig. 4 to the right of Fig. 3.

It is to be understood that the calling subscriber has dialed the complete number of the wanted subscriber, which number comprises for its last 3 digits the aforesaid call-number 200, into a register (not shown) and that said register has directed one or more group selectors (also not shown) to the terminals of the "fifties" selector SEC (Fig. 3), with which is associated the "fifties" selector director ORC, causing relays (not shown) in said director ORC to operate and to close contact *cs*1, as a result of which relays D*s* and T*b* operate.

The register then transmits the hundreds, tens and units digits of the dialed number, that is, the call-number 200, via conductors *a*, *b* (Fig. 3), into the digit register RCC forming part of director ORC. When these digits have been received and stored in receiver RCC upon relays C*n*, D*n* and U*n* (not shown), relay T*n* (also not shown) operates and closes contact *tn*1, operating via conductor *f'*89 one of two relays K*s* in the final selector director ORCC (Fig. 4), associated with a plurality of final selectors one or another of which has access to every line corresponding to the 500 call-numbers in the block including the call number 200. As soon as relay K*s* closes its contact K*s*1, said call-number 200 is repeated from a pyramid of contacts in receiver RCC, shown schematically by the three contacts *cn*2, *dn*2, *un*2, via conductor *f'*81, contact *ks*1 and conductor *ft*11 to corresponding storage relays C*m*, D*m*, U*m* (not shown), in another digit receiver RCC1 forming part of director ORCC, whereupon a similar pyramid of contacts, shown schematically by the three contacts *cm*1, *dm*1, *um*1, connects ground to conductor *ft*14, characteristic of the call-number 200 and connected to terminal 200 in row E1 of distributor RPM.

It will be understood that said distributor RPM, shown in outline only in Fig. 4, is the distributor RPM which has been elaborated in Fig. 1 and already described herein. Said ground appearing on terminal 200 is accordingly extended by a cross-connection to terminal P000 in row E2, which is characteristic of the line of subscriber P, and thence, via contacts *a*3, *c*3, of the line and cutoff relays A and C, respectively, associated with that line, and a decoupling resistor R*e*41, to one of twenty relays P*d* in director ORCC, which relay P*d* is characteristic of one half of the sub-group of 50 lines to which said line belongs. Relay P*d* upon closing its contact *pd*2 operates, via conductor *ft*6, contact *ks*3 and conductor *f'*88, one of ten relays G*s* in director ORC, which relay G*s* is characteristic of said sub-group and therefore indicates the "fifties" group from which a free final selector must be selected by selector SEC.

Relay G*s* operates, via contact *gs*1, conductor *f'*87 and contact *pd*1, one of twenty relays A*d*, also characteristic of one half of said sub-group of 50 lines. Relay A*d*, upon closing contact *ad*3, operates one of the twenty-five selection magnets S*f* of the particular multi-connector which has access to said sub-group and which, therefore, includes final selector CCN, in a circuit via conductor *ft*8, grounded as explained, contact *ad*3, conductor *ft*9, magnet S*f*, contact *sf*1 and resistor R*e*43. Magnet S*f*, upon changing over its contact *sf*1, holds in series with relay E*d*, which then operates. Relay E*d*, at contact *ed*1, operates one of the two selection magnets S*pf* of the same multi-connector, said magnet having been previously selected by contact *ad*2. Magnet S*pf* selects the particular half of the sub-group to which the called line belongs, and magnet S*f* selects the called line therefrom.

In the meantime, in director ORC, as soon as relay G*s* operates, one of several test relays T*a* operates via contact *gs*2, trunk conductor *r'*, contact *vf*3, in series with resistor R*e*42 associated with a free final selector, for example, selector CCN in the above-mentioned multi-connector, which latter has access as stated to the sub-group of 50 lines to which the called line belongs. Upon closing its contact *ta*1, relay T*a* connects the low-resistance winding of relay T*b* in parallel with its own high-resistance winding, in order to lower the test potential on conductor *r'* to "make busy" final selector CCN. Relay T*b*, now having opposing currents in its two windings, restores and at contact *tb*1 operates one of the twenty selection magnets S*s* and one of the two selection magnets S*ps* of the multi-connector which includes selector SEC, said particular magnets having been previously selected by contact *gs*4. Magnets S*s* and S*ps* together select the trunk comprising conductors *a'*, *b'*, *t'*, *v'*, *r'*, leading to final selector CCN.

With magnets S*pf* in the final selector multi-connector and S*ps* in the "fifties" selector multi-connector both operate, relay C*o* in director ORC operates, via contact *spf*1, conductor *ft*16, contact *ks*4, conductor *f'*84 and contact *sps*3. Relay C*o* operates control magnet VF of final selector CCN via contacts *co*1, *sps*1, *ss*1 and trunk conductor *v'*.

Magnet VF closes the switching contacts A', B', T', previously selected by magnets S*pf* and S*f*, thereby extending trunk conductors *a'*, *b'*, to the line of subscriber P and trunk conductor *t'* to relays A, C, belonging to that line. Relays A and C operate via contact T', trunk conductor *t'*, contacts *ss*2, *sps*2 and a winding of relay D*s* and hold via resistor R*e*44 and contact *vf*5. Relay D*s*, now having opposing currents in its two windings, restores and operates control magnet VS of "fifties" selector SEC via contacts *ds*1 and *co*2.

Magnet VS closes the switching contacts A, B, V, previously selected by magnets S*ps* and S*s*, thereby extending conductors *a*, *b*, to trunk conductors *a'*, *b'*, and to the line of subscriber P. Magnet VS also closes a locking circuit for itself via contact *vs*1 to ground (not shown) placed on conductor *v* at a preceding selection stage; it closes a holding circuit for magnet VF via contacts *vs*4, V and trunk conductor *v'*; and it disconnects conductor *t* from director ORC at contact *vs*2, whereupon directors ORC and ORCC restore to normal, in a manner described in the main application.

The line of subscriber P has thus been selected in accordance with the dialed call-number 200; ringing current may now be applied to said line from one of the several switching stages involved in the connection, in any well-known manner.

The manner in which a free line of a group of P. B. X lines designated by a common call-number, or a station on a multi-party line, is selected is similar to that of an individual subscriber line. The significantly different operations involved in some of these cases will now be described.

With reference again to Fig. 1, if the number dialed, 204 for example, is the call-number of a group of P. B. X lines, ground is applied to terminal 204 through pyramid contacts *c*, *d* and *u*, as previously explained, and is conveyed therefrom by cross-connections to the three terminals P008, P010 and P015, thus energizing one, two or three relays P*d* (Fig. 4), associated with the three lines of the group, respectively, according to the sub-group or sub-groups to which said lines have been assigned. As explained in the main application, only the selection magnets associated with one free line of the group operate and the connection is extended to that line.

When the number dialed is that of a station on a two-station party-line, number 214 or 218, for instance, the ground, which is applied to the corresponding terminal 214 or 218 through pyramid contacts *c*, *d* and *u*, is conveyed in either case to the output terminal P013, thus directing the last two stages of selection towards the party-line common to the two stations. In the case of station 214, the ground applied to terminal 214 is conveyed, through rectifier R*d*2, also to terminal X in row E3 and operates a relay connected thereto (not shown), which in turn brings into the circuit the appropriate ringing device. The ringer at station 218 does not operate, and only station 214 is called. On the other hand, if station 218 is dialed, the ground on terminal 218 cannot reach terminal X, on account of the decoupling rectifier R*d*1. Normal ringing current is accordingly applied and, in this case, only station 218 is called.

It will be understood that terminal X may be common to all the two-station party-lines. Thus, for example, it is similarly used in the case of station 208, which is connected to the party-line occupying position 007. Under these conditions, a decoupling rectifier such as R*d*3 is provided to prevent the ground on terminal X from being applied also to terminal 208 and thence to terminal P007, which would result in a false connection.

Lastly, when any of call-numbers 205, 209, 211 or 212 is dialed, ground is applied in all four cases to terminal P011, so as to direct the last two selection stages towards the corresponding four-station party-line. Ground is also applied to one of the four terminals A, B, C and D, so as to cause ringing current of a kind appropriate to the station wanted to be applied to said line. As in the preceding case, decoupling rectifiers such as R*d*8, R*d*9, R*d*10 and R*d*11 are provided to prevent undesirable coupling between terminals A, B, C and D. Terminals A, B, C and D may be common to several party-lines and the decoupling rectifiers R*d*4, R*d*5, R*d*6 and R*d*7 are therefore provided for the purpose of preventing a false connection from being made to a line other than the wanted line.

The arrangements described have the particular advantage of requiring only one position in the final selector banks for each party-line. The result is a saving of positions at the final selectors, and the possibility of using fewer final selector groups than would otherwise be required by the numbering scheme. If it is assumed, for example, that in a 10,000-subscriber exchange there are 4,000 single-station lines, 1,000 two-station party-lines and 1,000 four-station party-lines, it is necessary to equip final selectors having access to a maximum of 6,000 lines.

Alternatively, it is possible to use the positions made available, by the connection of a party-line to a single final selector position, for connecting P. B. X lines grouped under a common call-number. In the above-mentioned example, it will be seen that for the 10,000 numbers making up the exchange capacity, 4,000 positions of the 10,000 otherwise required can be saved. These 4,000 positions may be used to handle 4,000 lines grouped under a common call-number with other lines taken from among the 4,000 single-station lines. Thus, it is possible, for example, to provide 3,000 single-station subscriber lines and 1,000 P. B. X groups, each of 5 lines having the same call-number.

It will have been noted from the foregoing description that a decoupling rectifier is inserted in a cross-connection whenever the two terminals connected thereby are both cross-connected also to other terminals, as in the case of two-station and multi-station party-lines, whereas no decoupling rectifier is required in the case of individual single-party lines and P. B. X lines grouped under a common call-number, where this situation does not arise.

However, in the case of a group of P. B. X lines, it may be advantageous to be able to call one or more of said lines individually, by dialing individual call-numbers different from the common call-number of the group, as for example when said lines are temporarily connected directly to extension telephones at night and during other periods when the P. B. X switchboard is not staffed. Such a case is illustrated in Fig. 1, in which terminal 206 in row E1 is shown cross-connected by a dashed line to terminal P008 in row E2. It will be evident that, if the number 206 is dialed, the last two stages of selection will be directed towards the line associated with said terminal P008, and towards that line only, provided a decoupling rectifier R*d*13, shown dotted, is inserted in the cross-connection between terminals 204 and P008 in order to prevent the ground applied to said terminal P008 from reaching also, via said terminal 204, the terminals P009 and P015 associated with the other lines of the P. B. X group. It is to be particularly noted that any line, selected lines or all lines of a P. B. X group may be treated in this manner, contrary to the case of many well-known telephone switching systems in which the "first choice" line of a P. B. X group cannot be called individually.

Figure 2:
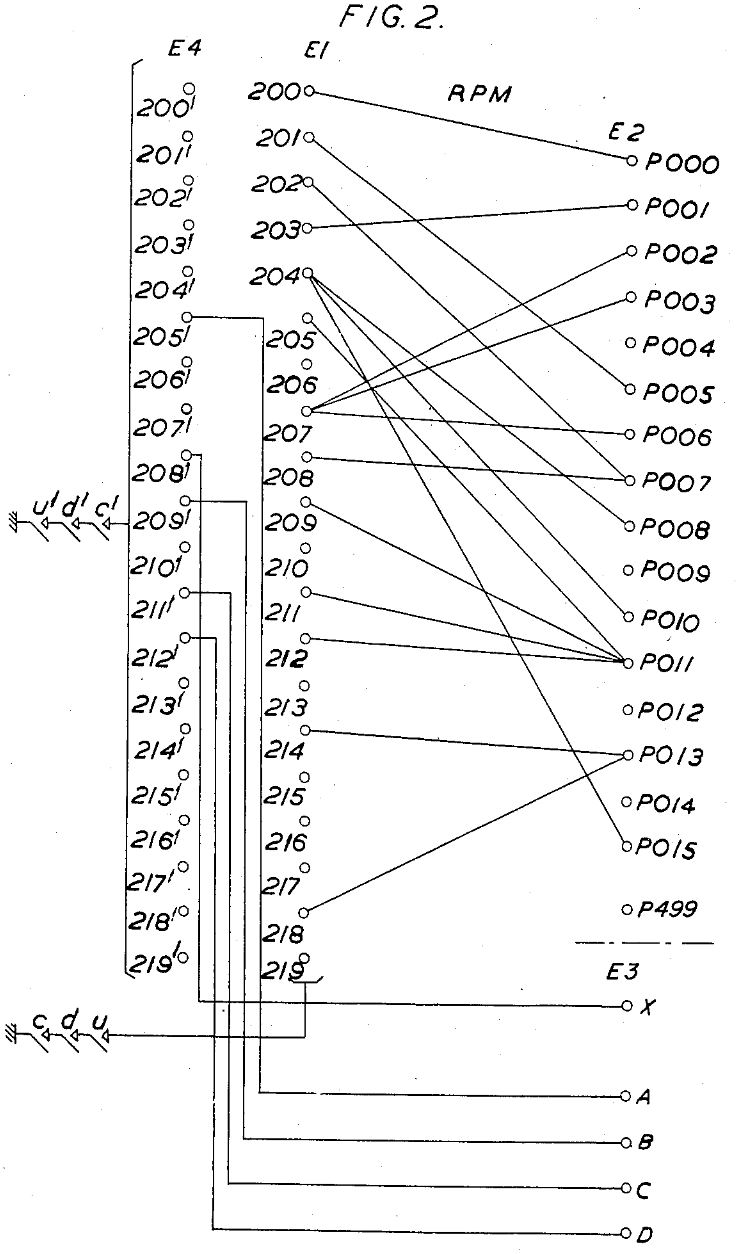
Fig. 2 is a variant of Fig. 1 wherein rectifiers are not used.

Fig. 2 is a variant of Fig. 1, wherein no rectifiers are used for preventing undesirable coupling between terminals. According to this variant, two terminal rows E1 and E4 are provided. Terminals 200 . . . 219 of row E1 are connected to the outputs of a pyramid of contacts *c*, *d*, *u*, and are used to ground one or more of the terminals P000 . . . P015 of row E2 and thereby to direct the last two stages of selection towards the desired line in the manner already described. Terminals 200′ . . . 219′ of row E4, connected to a separate pyramid of contacts *c′*, *d′*, *u′*, are cross-connected to terminals such as X or A, B, C, D, to control the ringing device that makes it possible to call selectively the different stations bridged on one and the same party-line. Under these conditions, no undesirable coupling between terminals is possible, and decoupling rectifiers are no longer needed.

It will be understood that the above description has been given only by way of a non-limitative embodiment and that the arrangements described for the particular case of an automatic switchboard of the cross-bar type may also find application in other switching systems. Marking distributors may likewise be provided capable of handling any preferred number of call-numbers.

I claim:

1. An automatic telephone exchange comprising a plurality of subscriber lines each having at least one call number, a final selector having a plurality of outlets, each outlet connected to a different one of said lines, a director connected to said final selector, means for setting said director in accordance with one of said call numbers, a distributing frame in said director comprising a first plurality of terminals each terminal thereof allocated to a different one of said call numbers, a second plurality of terminals each terminal thereof allocated to a different one of said lines and cross-connecting means coupling several of said first plurality of terminals to one of said second plurality of terminals, and means controlled by said cross-connecting means for actuating said final selector to select the line corresponding to said one of said second plurality of terminals when said director has been set in accordance with the call number corresponding to any one of said several terminals of said first plurality of terminals.

2. An automatic telephone exchange comprising a plurality of subscriber lines each having at least one call number and including a multi-station party-line having a different call number for each station thereon, a final selector having a plurality of outlets, each outlet connected to a different one of said lines, a director connected to said final selector, means for setting said director in accordance with one of said call numbers, a distributing frame in said director comprising a first plurality of terminals each terminal thereof allocated to a different one of said call numbers, a second plurality of terminals each terminal thereof allocated to a different one of said lines and first cross-connecting means coupling all the terminals of said first plurality of terminals allocated to said station call numbers to the terminal of said second plurality of terminals allocated to said party-line, and means controlled by said cross-connecting means for actuating said final selector to select said party-line when said director has been set in accordance with one of said station call numbers.

3. An automatic telephone exchange according to claim 2 and further comprising decoupling means included in said cross-connecting means and preventing undesired coupling between two of the terminals of said first plurality of terminals both coupled to one terminal of said second plurality of terminals.

4. An automatic telephone exchange according to claim 3 and in which said distributing frame further comprises a third terminal allocated to a ringing device for selectively ringing a particular station on said party-line, and second cross-connecting means coupling the terminal of said first plurality of terminals allocated to the call number of said particular station also to said third terminal.

5. An automatic telephone exchange according to claim 4 and in which said distributing frame further comprises additional third terminals each allocated to a different selective ringing device, each of the terminals of said first plurality of terminals allocated to said station call numbers being coupled by said second cross-connecting means also to a different one of said third terminals.

6. An automatic telephone exchange according to claim 4 and further comprising a second multi-station party-line, another of the terminals of said second plurality of terminals allocated thereto and another of the terminals of said first plurality of terminals allocated to the call number of a station thereon, said last-mentioned terminals also being coupled together by said first cross-connecting means, and said last-mentioned terminal of said first plurality of terminals also being coupled by said second cross-connecting means to said third terminal.

7. An automatic telephone exchange according to claim 6 and further comprising decoupling means included in said second cross-connecting means and preventing undesired coupling between two of the terminals of said first plurality of terminals both coupled to said third terminal.

References Cited in the file of this patent

UNITED STATES PATENTS

| | | |
|---|---|---|
| 2,585,904 | Busch | Feb. 19, 1952 |
| 2,633,498 | Schneckloth | Mar. 31, 1953 |